United States Patent
Britton et al.

(10) Patent No.: US 6,401,136 B1
(45) Date of Patent: Jun. 4, 2002

(54) METHODS, SYSTEMS AND COMPUTER PROGRAM PRODUCTS FOR SYNCHRONIZATION OF QUEUE-TO-QUEUE COMMUNICATIONS

(75) Inventors: Kathryn H. Britton, Chapel Hill; Andrew P. Citron, Raleigh; Barron C. Housel, III, Chapel Hill; Ajamu Akinwunmi Wesley, Raleigh, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/191,637

(22) Filed: Nov. 13, 1998

(51) Int. Cl.[7] .................................................. G66F 9/46
(52) U.S. Cl. ...................................................... 709/314
(58) Field of Search .................................. 709/206, 213, 709/227, 248, 300, 310, 314; 370/503, 350, 278; 375/354; 710/52

(56) References Cited

U.S. PATENT DOCUMENTS

| | | | |
|---|---|---|---|
| 3,177,854 A | 4/1965 | Garcea | |
| 4,554,898 A | 11/1985 | Yamada et al. | 123/188 AA |
| 5,121,479 A | 6/1992 | O'Brien | 395/250 |
| 5,261,089 A | 11/1993 | Coleman et al. | 395/600 |
| 5,269,017 A | 12/1993 | Hayden et al. | 395/575 |
| 5,276,876 A | 1/1994 | Coleman et al. | 395/650 |
| 5,319,773 A | 6/1994 | Britton et al. | 395/575 |

(List continued on next page.)

FOREIGN PATENT DOCUMENTS

| | | | |
|---|---|---|---|
| CA | 1322607 | 1/1989 | G06F/13/009 |
| JP | 61-41063 | 2/1986 | F16H/5/64 |
| WO | WO 95/10805 | 4/1995 | G06F/9/46 |
| WO | WO 97/46939 | 12/1997 | G06F/9/46 |

OTHER PUBLICATIONS

Application to Host File Transfer Restart Method, *IBM Technical Disclosure Bulletin*, vol. 31, No. 5, pp. 409–410 (Oct. 1988).
Synchronous Interleaved I/O File Server, *IBM Technical Disclosure Bulletin*, vol. 32, No. 9B, pp. 91–92 (Feb. 1990).
Client/Server–based File Transmission Checkpoint/Restart Protocol, *IBM Technical Disclosure Bulletin*, vol. 38, No. 09, pp. 191–193 (Sep. 1995).
Combining Presumed Abort Two–Phase Commit Protocols with SNA's Last Agent Optimiation, *IBM Technical Disclosure Bulletin*, vol. 34, No. 7B, pp. 334–338 (Dec. 1991).
Efficient Commit Protocol for Shared Nothing Architectures using Common Log Server, *IBM Technical Disclosure Bulletin*, vol. 36, No. 12, pp. 65–66 (Dec. 1993).
Two–Phase Commit Resynchronization, *IBM Technical Disclosure Bulletin*, vol. 39, No. 01, pp. 79–80 (Jan. 1996).

*Primary Examiner*—Saleh Najjar
(74) *Attorney, Agent, or Firm*—Myers Bigel Sibley & Sajovec

(57) ABSTRACT

Methods, systems, and computer program products are provided for communicating between a source device and a destination device over an external communication link by transmitting a message stored in a source persistent queue at the source device over the external communication link to the destination device. The transmitted message has transmitted with it an associated sequence identifier which identifies the message stored in the source persistent queue. The transmitted message and the associated sequence identifier are received at the destination device and stored in a destination persistent queue at the destination device. Occasionally, a commit message is transmitted to the source device from the destination device which identifies a sequence identifier associated with received message which has been persistently stored in the destination persistent queue. The persistently stored message in the destination persistent queue is made available to users of the destination device independent of whether a commit message identifying the message has been transmitted to the source device.

33 Claims, 3 Drawing Sheets

U.S. PATENT DOCUMENTS

| | | | |
|---|---|---|---|
| 5,319,774 A | 6/1994 | Ainsworth et al. | 395/575 |
| 5,371,886 A | 12/1994 | Britton et al. | 395/600 |
| 5,428,771 A | 6/1995 | Daniels et al. | 395/575 |
| 5,432,926 A | 7/1995 | Citron et al. | 395/575 |
| 5,446,904 A | 8/1995 | Belt et al. | 395/750 |
| 5,469,503 A | 11/1995 | Butensky et al. | 379/265 |
| 5,500,890 A | 3/1996 | Rogge et al. | 379/91 |
| 5,546,582 A | 8/1996 | Brockmeyer et al. | 395/650 |
| 5,551,043 A | 8/1996 | Crump et al. | 395/750 |
| 5,555,266 A * | 9/1996 | Buchholz et al. | 370/347 |
| 5,561,797 A | 10/1996 | Gilles et al. | 395/600 |
| 5,613,060 A | 3/1997 | Britton et al. | 395/182.13 |
| 5,648,970 A * | 7/1997 | Kapoor | 370/394 |
| 5,666,494 A * | 9/1997 | Mote, Jr. | 711/167 |
| 5,751,719 A * | 5/1998 | Chen et al. | 370/473 |
| 5,758,174 A | 5/1998 | Crump et al. | 395/750.05 |
| 5,765,004 A | 6/1998 | Foster et al. | 395/750.05 |
| 5,768,538 A | 6/1998 | Badovinatz et al. | 395/200.78 |
| 5,802,267 A | 9/1998 | Shirakihara et al. | 395/182.13 |
| 5,916,307 A * | 6/1999 | Piskiel et al. | 709/301 |
| 5,961,605 A * | 10/1999 | Deng et al. | 709/234 |
| 6,065,052 A * | 5/2000 | Van Loo | 709/224 |
| 6,078,564 A * | 6/2000 | Lakshman et al. | 370/235 |

* cited by examiner

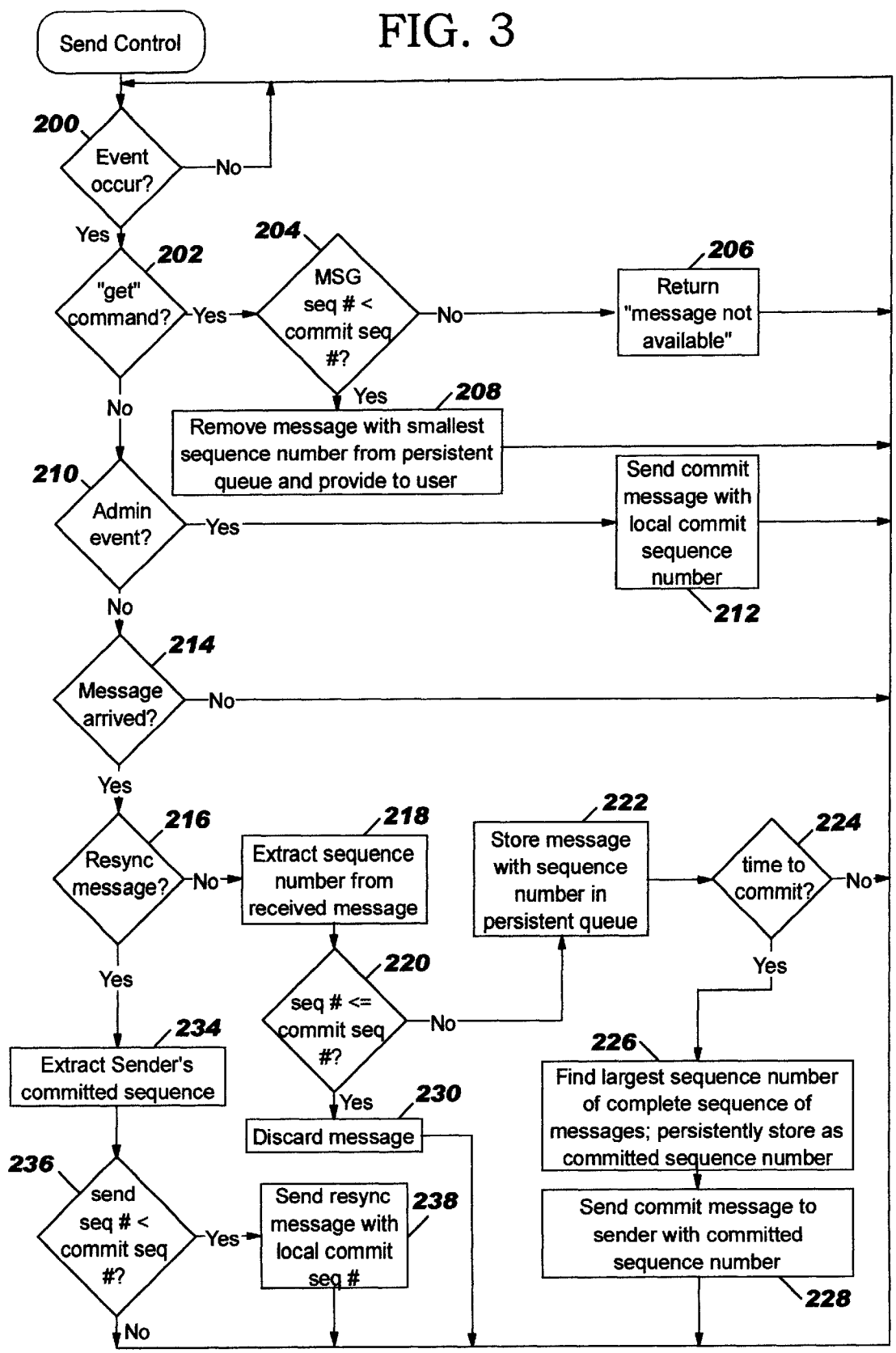

METHODS, SYSTEMS AND COMPUTER PROGRAM PRODUCTS FOR SYNCHRONIZATION OF QUEUE-TO-QUEUE COMMUNICATIONS

FIELD OF THE INVENTION

The present invention relates to message transfers and more particularly to message transfers well suited to the varying connection environments of mobile computing.

BACKGROUND OF THE INVENTION

In mobile applications, such as with personal data assistants (PDAs), smart telephones or laptop computers, often times off-line processing (or "intermittently connected operations") may be carried out so as to work without being continuously connected to a network or other processing system. One aspect of off-line processing involves the transfer of messages between the mobile processing system to the network or other processing system.

Conventional off-line processing for message transfers typically would result in a queue of message transfers. The message transfers would be made in a serial fashion when a connection was established. Typically, if the connection was lost during the message transfer, the message transfer may have to be started all over. Thus, for example, in file transfers, if the connection was lost, the entire file transfer may have to be started from the beginning of the file.

Various systems have been developed in attempts to overcome limitations of data transfers. For example, U.S. Pat. No. 5,751,719 to Chen et al. entitled METHOD AND SYSTEM FOR DATA TRANSFER IN THE PRESENCE OF DISCONNECTS describes methods and systems for controlling data transfer operations during a communication between a transmitter and a receiver. Data packets which have been stored at the receiver remain stored there even after a disconnect to avoid the need for retransmitting the data packets. Data transmission is then resynchronized after the connection is reestablished.

Another example of a checkpoint system is provided in certain implementations of the Internet File Transfer Protocol (FTP). These implementations allow checkpointing of individual file transfers, however, they typically do not provide checkpointing for multiple file transfers. FTP implementations also use multiple transport-level connections which may be impractical for many mobiles users, particularly those that use wireless networks.

Other checkpoint or restarting systems are described in U.S. Pat. Nos. 5,121,479, 5,269,017, 5,446,904, 5,551,043, 5,758,174, 5,765,004, and 5,802,267. Other checkpoint or restart systems are also described in IBM Technical Disclosures Vol. 38, No. 9, pp. 191–93 (1995) and Vol. 31, No. 5, pp. 409–410 (1988).

While various systems have been developed for checkpointing or restarting communications, in a mobile environment where the characteristics of the connection may vary widely, for example, from direct network connection to low speed connection over a wireless modem, the communication protocols which implement these systems may be cumbersome. For example, the single phase and two phase commit sequences as described in the background of PCT Publication WO 95/10805 entitled MESSAGE TRANSMISSION ACROSS A NETWORK, includes a commit sequence where each side of a transaction remains synchronized by responding to a commit instruction at sync points. If the commit cannot be synchronously carried out, then the participants in the transaction must resynchronize. In the two phase commit sequence, a prepare phase is included in the sequence. In the prepare phase it is determined if a commit instruction could be carried out. If the prepare phase determines that the commit may be carried out, then the commit is carried out. However, if the prepare phase determines that the commit may not be carried out, then the current transaction is backed out to the last common commit point (i.e. resynchronized).

The particular system of WO 95/10805 describes commit processing where a successful receipt of a message by a receiver program results in transmitting to the sender a positive confirmation of receipt and an unsuccessful receipt results in sending to the sender a negative confirmation of receipt. PCT publication WO 95/10805 describes the system as sending a "batch" of messages from the sender to the receiver and then either confirming success or failure of the entire batch. However, such a batch system still may involve overhead for the successful/unsuccessful confirmation message and, furthermore, may require retransmission of entire batches if the transmission is unsuccessful. Thus, if the batches of messages are large, the number of messages which must be re-transmitted may be large and may consume large amounts of system resources to maintain the messages until the commit is received. However, if the batches are small so as to reduce system resource requirements and re-transmission requirements, then the number of commit messages increases which may increase overhead and result in associated message delays.

Similarly, other systems for synchronization, fault tolerance of communications between devices or commit procedures include U.S. Pat. Nos. 5,261,089, 5,276,876, 5,319,773, 5,319,774, 5,371,886, 5,428,771, 5,432,926, 5,546,582, 5,561,797, 5,613,060, and 5,768,538, PCT Publication No. WO 97/46939, and IBM Technical Disclosure Bulletins, Vol. 34, No. 7B, pp. 334–338 (December 1991), Vol. 36, No. 12, pp. 65–66 (December 1993) and Vol. 39, No. 1, pp. 79–80 (January 1996).

While these previous systems may allow for fault tolerance in communications, the number of communications required to carry out the fault tolerant procedure may be overly burdensome in some communication environments. For example, over a low speed communication link it may be desirable to minimize protocol overhead so as to maximize data transfer. However, in light of the unreliable nature of communication connections in a mobile computing environment it is also desirable to provide tolerance of faults in the communication connection which typically results in increased protocol overhead for communications.

Thus, despite previous efforts, a need still exists for improvements in communications, in particular in the mobile environment, which may include varying connection types with differing levels of reliability.

SUMMARY OF THE INVENTION

In view of the above discussion, it is an object of the present invention to provide for efficient fault tolerant message transfer in differing and unreliable communication environments.

A further object of the present invention is to provide message transfers suitable for use with devices of differing capabilities.

Still another object of the present invention is to provide a message transfer mechanism which is tolerant of disconnect events.

These and other objects of the present invention are provided by communicating between a source device and a destination device over an external communication link by transmitting a message stored in a source persistent queue at the source device over the external communication link to the destination device. The transmitted message has transmitted with it an associated sequence identifier which identifies the message stored in the source persistent queue. The transmitted message and the associated sequence identifier are received at the destination device and the received message and the associated sequence identifier stored in a destination persistent queue at the destination device. A commit message is transmitted to the source device from the destination device. The commit message identifies a largest sequence identifier of consecutive sequence identifiers associated with received messages of a sequence of messages which have been persistently stored in the destination persistent queue. The persistently stored message in the destination persistent queue is made available to users of the destination device independent of whether a commit message identifying the message has been transmitted to the source device.

By maintaining persistent queues on each device and then communicating commit messages between the device, the persistent queues may be maintained in synchronization while maintaining the messages transmitted and received across sessions. By occasionally sending commit messages, commit messages need not be transmitted with each message. Thus, overhead associated with sending commit messages may be reduced. Furthermore, by making the received messages available independent of the commit message being transmitted to the source device and allows commit messages to be transmitted less frequently without affecting message availability. Thus, the present invention allows data to be more quickly available to applications communicating using the message queues.

In a further embodiment of the present invention, the source device may receive a commit message from the destination device and then discards from the source persistent queue, messages having associated sequence identifiers which are not greater than the sequence identifier of the received commit messages. Furthermore, the discards may take place after receiving multiple commit messages, where the highest sequence identifier received is used to discard messages. Thus, the source device may discard multiple messages from the source persistent queue without having to receive multiple messages from the destination device. Such a cumulative commit procedure may also allow for more rapid re-synchronization as a single message may indicate commits for multiple messages. Also, in contrast with a batch procedure, if a message was committed at the destination queue, then that message need not be re-transmitted, even if the commit message is lost as the commit would be reflected in a subsequent commit message. Furthermore, because the commit messages are cumulative, the discard procedure at the source may be asynchronous and performed at a time which minimizes any performance impact that carrying out the discard procedure may have on the communications between the source and the destination.

In another embodiment of the present invention, it is determined if a new connection between the source device and the destination device has been established. Responsive to determining if a new connection has been established, the highest sequence identifier of a message persistently stored in the destination persistent queue is transmitted from the destination device to the source device. Furthermore, in such an embodiment, a message stored in the source persistent queue having an associated sequence identifier which is a next greater sequence identifier than the sequence identifier received from the destination device may be determined responsive to determining if a new connection has been established. Transmission of messages stored in the source persistent queue to the destination device then begins from the determined message stored in the source persistent queue having an associated sequence identifier which is a next greater sequence identifier than the sequence identifier received from the destination device. Also, messages from the source persistent queue having an associated sequence identifier which is not greater than the highest sequence identifier received from the destination device may be discarded.

In such an embodiment, the restart of message transmission as well as the discarding of messages in the source persistent queue may be accomplished with the resync message received after connection. Thus, the re-synchronization may be accomplished rapidly and efficiently utilizing the persistent queues and the cumulative commit procedure. By utilizing the cumulative commit procedure, messages which were committed in the destination queue but for which a commit message was not sent in the previous connection, need not be discarded or re-transmitted. Thus, the amount of re-transmitted messages is reduced to those messages which were sent but not committed at the destination.

In still another embodiment of the present invention, a resync message is transmitted from the source device to the destination device. Responsive to receiving a resync message, the highest sequence identifier of a message persistently stored in the destination persistent queue is transmitted from the destination device to the source device. Such a commit on request procedure allows the queues to operate asynchronously with regard to commits but cooperatively if the source persistent queue were to, for example, need to free space by discarding committed messages.

In a further embodiment, when a request from a user application of the destination device for a message received from the source device is received, it is determined if a received message and an associated sequence identifier are stored in the destination persistent queue at the destination device have an associated sequence identifier which is not greater than a highest sequence identifier associated with a persistently stored message. The requesting user application may then be provided a message stored in the destination persistent queue with the smallest sequence identifier if a received message and an associated sequence identifier is stored in the destination persistent queue at the destination device has an associated sequence identifier which is not greater than a highest sequence identifier associated with a persistently stored message.

As will further be appreciated by those of skill in the art, the present invention may be embodied as methods, systems or computer program products.

BRIEF DESCRIPTION OF THE DRAWINGS

FIG. 3 is a flow chart illustrating operations performed by a receiving device according to the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods, systems of computer program products. Accordingly, the present invention may take the form of an entirely hardware embodiment, an entirely software embodiment or an embodiment combining software and hardware aspects.

Figure 1:
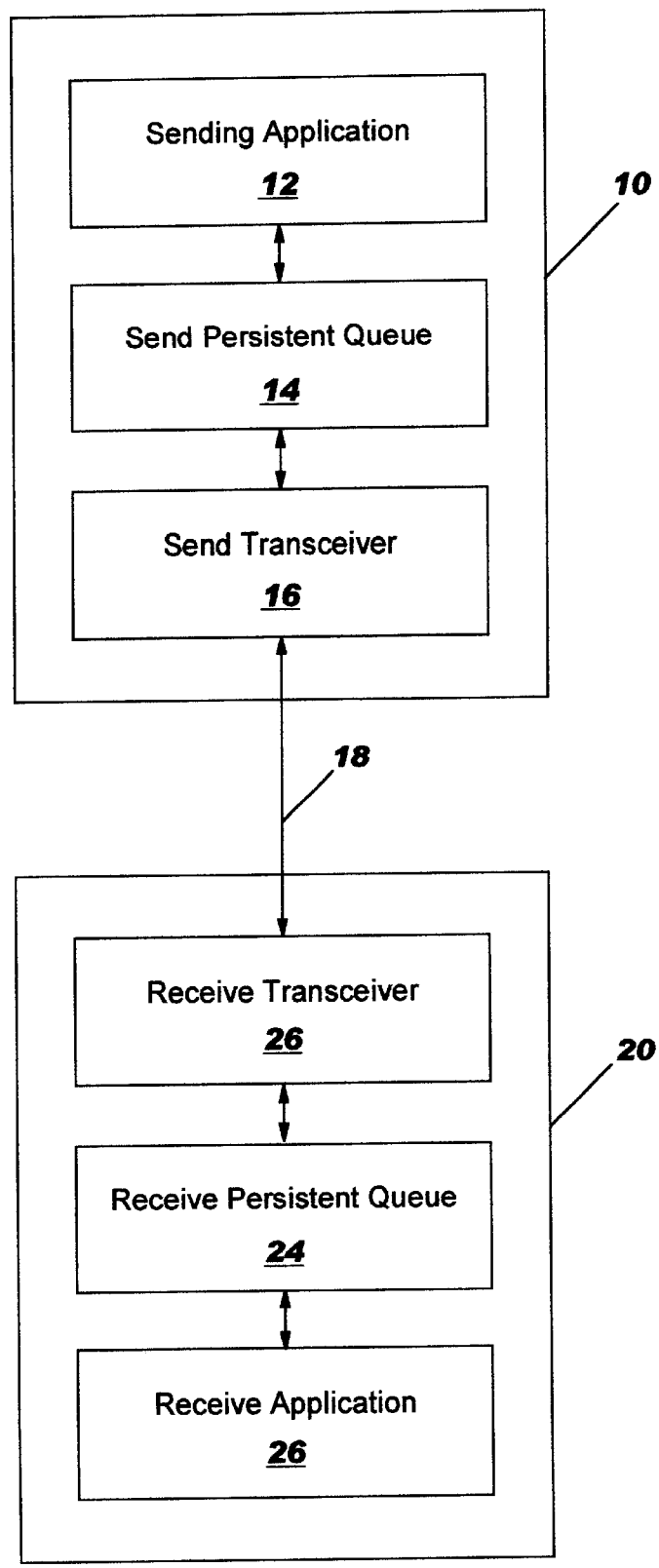
FIG. 1 is block diagram illustrating a system for message transfer according to the present invention.

One embodiment of the queue-to-queue transfer system of the present invention is illustrated in FIG. 1. As seen in FIG. 1, a first data processing system 10, such as a personal data assistant (PDA), laptop computer, workstation or other data processing system, communicates with a second data processing system 20, such as a server, proxy server, workstation or other such data processing system. For illustration purposes, data processing system 10 is illustrated as a sending device and data processing system 20 is illustrated as a receiving device, however, as will be appreciated by those of skill in the art, either data processing system could be a sending device or a receiving device as long as the appropriate sending and receiving queue mechanisms are resident on the data processing systems. However, for clarity of the present disclosure, the data processing system 10 shall be referred to herein as the "sending device" or "source device" and the data processing system 20 shall be referred to herein as the "receiving device" or the "destination device."

As is seen in FIG. 1, the sending device 10 and the receiving device 20 communicate over an external communication link 18. The external communication link 18 may be any communication link suitable for transmitting messages. For example, the external communication link may be a network connection, a modem, a direct serial or parallel connection or a proprietary communication interface connection. Furthermore, the external communication link may connect the sending device 10 to the receiving device 20 through intermediate devices as may, for example, exist if the connection was an Internet connection.

As is further illustrated in FIG. 1, the sending device 10 has associated with it a sending application 12 which may be any application which provides messages to be sent from sending device 10 to receiving device 20. For example, the sending application may be an e-mail application, a file transfer application, a web browser or other such application programs executing on sending device 10 or communicating through sending device 10. Thus, the illustration of a sending application in FIG. 1 is provided to illustrate a source of messages to be transmitted from the sending device to the receiving device 20 and should not be construed as limiting the scope of the present invention.

The sending application 12 provides messages to be transmitted to receiving device 20 to a send persistent message queue 14. The send persistent message queue 14 maintains the messages to be sent between execution of instances of the queue-to-queue transfer system according to the present invention and more preferably between power cycles of the sending device 10 or the receiving device 20. Furthermore, the send persistent message queue 14 should also maintain persistence even if the connection between the sending device 10 and the receiving device 20 are disconnected. Thus, the send persistent message queue 14 should be persistent from session to session of connections between the sending device 10 and the receiving device 20. The send persistent message queue 14 may store the messages in any sequence, however, as described below, at least the sequence indicators of transmitted messages remaining on the queue should be maintained from session to session.

The send persistent message queue 14 should maintain a sequence indicator associated with each transmitted message persistently stored in the send persistent message queue 14. The sequence indicator should describe the sequence in which the messages were sent from the sending device 10 to the receiving device 20. The sequence indicator is preferably a numerical value such as a sequence number which increments in the order of transmission of the messages. Thus, a message transmitted later would have a higher sequence indicator than one transmitted earlier.

Sequence indicators can be pre-assigned or assigned at the time of transmission and then associated with the message and persistently stored in the send persistent message queue 14. Messages put in the send queue are stored persistently along with their sequence indicators before they are sent. Generally, queuing mechanisms store messages persistently before returning from the "put" command so that the sending application 12 can assume that the message will be reliably delivered to receiving system 20, even if the sending system 10 powers down before the message can be sent.

As is further illustrated in FIG. 1, the send persistent message queue 14 provides messages to a send transceiver 16 which transmits the messages and the message's associated sequence indicator to the receiving device 20 over the external communication link 18. The send transceiver 16 may assign the message sequence indicator to the message at the time of transmission of the message and persistently store the message sequence indicator associated with the message in the send persistent message queue 14. Alternatively, the sequence indicator could be assigned by the send persistent message queue 14. The send persistent message queue 14 or the send transceiver 16 should also be capable of selecting and providing to the send transceiver 16 for re-transmission to the receiving device 20, messages remaining in the send persistent message queue 14 which have been assigned sequence indicators but which have not been confirmed as committed by the receiving device 20.

FIG. 1 also illustrates the receiving device 20 which includes a receive transceiver 26 which receives and transmits messages on the communication link 18. The transceiver provides received messages to a receive persistent message queue 24 which persistently stores the received messages and sequence indicator. After persistently storing the received message, the receive persistent message queue 24 may make the received message available to the receive application 22 to which the message was to be sent. As will be appreciated by those of skill in the art, the receive application 22 may be any application capable of receiving a message, including for example, server applications, file transfer applications, or message routing applications which forward the message to another device. Thus, the illustration of a receiving application in FIG. 1 is provided to illustrate a destination of messages to transmitted from the sending device 10 to the receiving device 20 and should not be construed as limiting the scope of the present invention.

The receive persistent message queue 24 maintains the messages received from the sending device 10 between execution of instances of the queue-to-queue transfer system according to the present invention and more preferably between power cycles of the receiving device 20 or the sending device 10. Furthermore, the receive persistent message queue 24 should also maintain persistence even if the connection between the sending device 10 and the receiving device 20 are disconnected. Thus, the receive persistent message queue 24 should be persistent from session to session of connections between the sending device 10 and the receiving device 20. The receive persistent message queue 24 may store the messages in any sequence, however, at least the sequence indicator of the last received message which was persistently stored (i.e. committed) should also be maintained from session to session. Thus, the receive queue 24 remembers the sequence indicator of the most recently committed message even if the message itself has been delivered to the receiving application 26 and erased from the receive queue 24.

After the received messages are persistently stored, the receive transceiver 26 may send a commit message to the send transceiver 16 where the commit message indicates a sequence indicator of a message persistently stored in the receive persistent message queue 24. The commit message need not be sent upon receipt of every message but may be occasionally sent based on time, number of messages received or other criteria defined by a user. The commit message preferably included the highest sequence indicator of a message ever stored persistently in the receive message queue 24.

As will be appreciated by those of skill in the art, other variations of the distribution of operations between the various functions of the queue-to-queue transmission system of the present invention may be utilized while still benefitting from the teachings of the present invention. Similarly, the present invention may be utilized in any number of systems which provide for persistent queue-to-queue transmission. Thus, for example, the present invention may be utilized in systems such as those described in commonly assigned U.S. patent application Ser. No. 09/173,778, filed Oct. 16, 1998, entitled METHODS, SYSTEMS AND COMPUTER PROGRAM PRODUCTS FOR RESTARTABLE MULTIPLEXED FILE TRANSFERS, the disclosure of which is incorporated by reference herein as if set forth fully, or in commonly assigned and concurrently filed U.S. patent application Ser. No. 09/192,128, entitled METHODS, SYSTEMS AND COMPUTER PROGRAM PRODUCTS FOR DIFFERENCING DATA COMMUNICATIONS USING A MESSAGE QUEUE, the disclosure of which is also incorporated herein by reference as if set forth fully. Accordingly, the system and/or division of functions described with respect to FIG. 1 is provided for exemplary purposes so as to explain the various operations and aspects of the present invention. Thus, the present invention should not be construed as limited to any particular configuration or division of functions.

The present invention will now be described with respect to FIG. 2 and FIG. 3 which are flowcharts illustrating the operation of a queue-to-queue message transfer system according to the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustration support combinations of means for performing the specified functions, combinations of steps for performing the specified functions, and program instruction means for performing the specified functions. It will also be understood that each block of the flowchart illustration, and combinations of blocks in the flowchart illustration, can be implemented by special purpose hardware-based systems which perform the specified functions or steps, or combinations of special purpose hardware and computer instructions.

Figure 2:
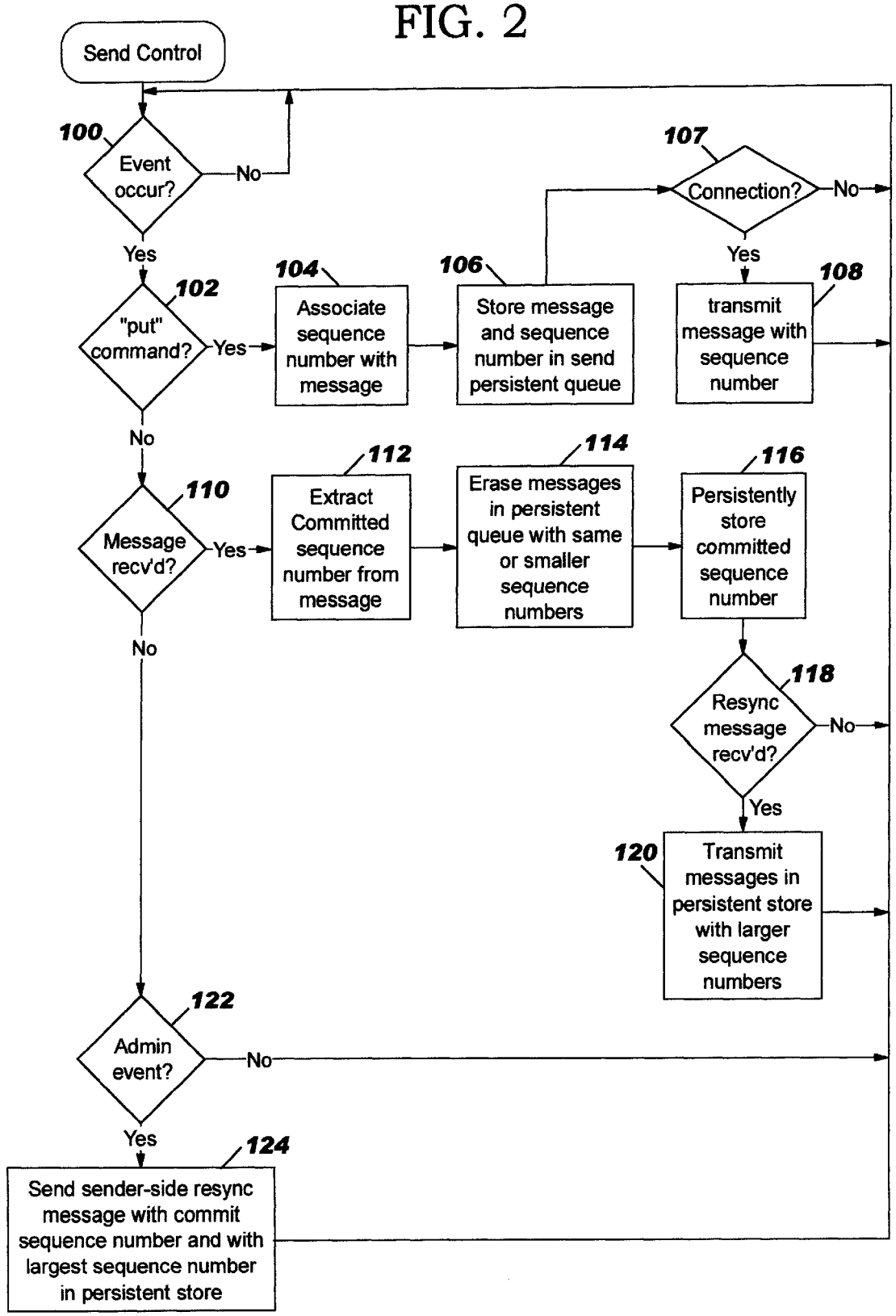
FIG. 2 is a flow chart illustrating operations performed by a sending device according to the present invention.

FIG. 2 illustrates operations of the present invention which control sending of messages from the sending device 10 to the receiving device 20 over the external communication link 18. As described above, the control operation described herein may be carried out by the send persistent message queue 14, the send transceiver 16, a combination of the two or by a control function separate from the two. Thus, the present invention should not be limited to any particular division of functions.

Returning now to FIG. 2, the control of the send operations waits for an event which requires action to occur (block 100). Such events would typically include, but may not be limited to, receipt of a message by the send transceiver 16, receipt of a request to send a message by a sending application 12 or the detection that a connection was established. It is then determined if the event was a "put" command which provides a message to be transmitted over the external communication link 18 (block 102). If the event was a "put" command, then the next available sequence number is associated with the message (block 104) and the message and sequence number are persistently stored in the send persistent message queue 14 (block 106). It is then determined if a connection is available to transmit the message (block 107). If a connection is available, the message is then transmitted with the sequence number by the send transceiver 16 over the external communication link 18 to the receiving device 20 (block 108). As will be appreciated by those of skill in the art, the transmission of the message need not immediately occur but may be delayed depending upon whether other messages are stored in the send persistent message queue 14 which have yet to be transmitted. Thus, for example, as illustrated by block 107, if a connection is not available, transmission may be delayed until occurrence of another event.

If the event was not a "put" command (block 102), then it is determined if the event was receipt of a message from the receive transceiver 26 (block 110). If the event was a received message, then the committed sequence number is extracted from the received message (block 112). At this time or at a later time, messages in the persistent queue with the same of a smaller sequence number as the received committed sequence number are erased from the send persistent message queue 14 (block 114). Thus, for example, if the erase procedure delays sending operations, the erase procedure could be delayed until the connection was no longer available to send data. Accordingly, the erasure or removal of messages from the send persistent message queue 14 may be asynchronous from the receipt of the commit message from receiving device 20.

In any event, the committed sequence number received in the message from the receiving device 20 is persistently stored at the sending device to indicate the highest sequence number which has been committed by the receiving device 20 (block 116). It may then be determined if the received message was a resync message from the receiving device 20 (block 118). If the message was not a resync message then the message was a commit message and control waits for the next event. If the message was a resync message then messages in the send persistent message queue 14 which have a higher sequence number than the committed sequence number received in the resync message are transmitted to the receiving device 20 (block 120). Some of these messages may be re-transmissions.

If the event was not receipt of a message, then it is determined if the event was an administrative event which required the sending device to send a resync message to the receiving device 20 (block 122). Two examples of such an administrative event are, for example the detection of a connection start between the sending device 10 and the receiving device 20, or if the send persistent message queue reached a fill threshold. When a connection is established, in order to avoid sending messages which have been committed at the receiving device and persistently stored there but which have not been indicated as committed to the sending device 10, the sending device 10 may send a resync message to the receiving device 20 to update the synchronization of the send and receive queues as described below. Similarly, because the commit procedures of the present invention may be asynchronous between the receiving device 20 and the sending device 10, if the send persistent queue 14 is of limited size, the send persistent message queue 14 may near filling before a commit message is received from the receiving device 20. Thus, the sending device 10 may request a commit message from the receiving device 20 so as to allow the sending device to erase messages in the send persistent message queue 14.

If the event was an administrative event, then the sending device 10 sends a sender-side resync message with the last persistently stored commit sequence number received from the receiving device 20 and with the largest sequence number in the send persistent message queue 14 (block 126). The largest sequence number in the send persistent message queue 14 which is included in the commit message will typically be the largest number in the queue. However, in the event of non-sequential transmission of messages, the largest number included in the persistent message queue 14 which is included in the commit message should be the largest sequence number of a continuous sequence of sequence numbers associated with a series of messages. Thus, for example, if sequence numbers 20, 21, 22, 23 and 27 were sent, then the largest sequence number would be 23 as it is the largest sequence number in a continuous sequence of sequence numbers.

As described below, in response to the sender-side resync message, the receiving device 20 sends a resync message to synchronize the commit information between the two queues. In this manner, connections may be restarted efficiently, with the communications between the two queues beginning with the next message which was not committed at the receiving device 20. Thus, with at most two messages, an interrupted connection may be restarted.

FIG. 3 illustrates the operations of the receiving device 20 according to the present invention. As seen in FIG. 3, the receiving device waits for an event to occur which requires action (block 200). When such an event occurs, it is determined if the event is a "get" command received from a receive application 26 (block 202). A "get" command is a command received from an application to obtain a committed (persistently stored) message from the receive persistent message queue 24. Thus, as seen in FIG. 3, if the event is a "get" command then it is determined if there are any messages in the receive persistent message queue 24 with a sequence number which is less than a persistently stored committed sequence number which is the highest sequence number of a committed message (the local committed sequence number) (block 204). If there are no messages with sequence numbers less than the local committed sequence number, then no messages are available to the receive application 22 and a "message not available" will be returned (block 206). Alternatively, the "get" command could be blocked until a message arrives and is committed. If there is a message in the receive persistent message queue 24 with a sequence number less than the local committed sequence number, then the message with the smallest sequence number in the receive persistent message queue 24 is removed and provided to the receiving application 22 (block 208). Thus, persistently stored messages may be removed from the receive persistent message queue 24 as they are provided to user applications.

If the event was not a "get" command, it is determined if the message was an administrative event such as an indication of a started connection (block 210). If the event is a connection started event, then a resync message is sent to the sending device 10 which specifies the local committed sequence number (block 212).

If the event was not an administrative event, then it is determined if the event was receipt of a message from the sending device 10 (block 214). If the event was not a message received, then the control waits for the next event. If the event was a message received, then it is determined if the received message was a resync message from the sending device 10 (block 216). If the message is not a resync message, then the sequence number of the message is extracted from the message (block 218) and it is determined if the extracted sequence number is less than or equal to the local committed sequence number (block 220). If the extracted sequence number is less, then the message was previously received and persistently stored by the receiving device 20 and is, therefore, discarded (block 230).

However, if the extracted sequence number is not less than or equal to the local committed sequence number, then the message and the associated extracted sequence number are persistently stored in the receive persistent message queue 24 (block 222). If it is determined that it is time to commit the messages (block 224), based on any of a number of criteria such as the number of messages received, the time since the last commit or other criteria as discussed above, then the largest sequence number of a complete sequence of a message persistently stored in the receive persistent message queue 24 is persistently stored as the local committed sequence number (block 226). A commit message is then sent to the sending device 10 which specifies the local committed sequence number (block 228).

If the message is a resync message (block 216), then the sender's committed sequence number is extracted from the message (block 234). The sender's committed sequence number is compared to the local committed sequence number (block 236) and if less than the local committed sequence number then a resync message with the local committed sequence number is transmitted to the sending device 10 (block 238).

As is seen from the above discussion, the present invention provides for control of queue-to-queue communications by providing asynchronous local control of the queues while providing synchronization of the queues between the sending and receiving devices with a only a few messages. Such a reduced overhead queue-to-queue communication system may be well suited to mobile computing, to unreliable communication media where multiple disconnects may occur or to use of limited bandwidth or expensive media.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of communicating between a source device and a destination device over an external communication link utilizing a queue-to-queue transfer system, the method comprising:

transmitting messages stored in a source persistent queue at the source device over the external communication link to the destination device, wherein the transmitted messages have transmitted with them an associated sequence identifier which identifies the message stored in the source persistent queue and wherein the source persistent queue maintains the messages to be transmitted and associated sequence identifiers between execution of instances of the queue-to-queue transfer system by the source device;

receiving the transmitted messages and the associated sequence identifiers at the destination device in an order other than an order of the sequence identifiers of the messages and storing the received message and the associated sequence identifier in a destination persistent queue at the destination device and wherein the destination persistent queue maintains the received message and associated sequence identifier between execution of instances of the queue-to-queue transfer system by the destination device;

transmitting to the source device from the destination device a commit message, wherein the commit message identifies a largest sequence identifier of consecutive sequence identifiers associated with received messages of a sequence of messages which have been persistently stored in the destination persistent queue; and making the persistently stored message in the destination persistent queue available to users of the destination device independent of whether a commit message identifying the message has been transmitted to the source device.

2. A method according to claim 1, further comprising:

receiving at the source device a commit message from the destination device, wherein the commit message specifies a sequence identifier of a message; and then discarding from the source persistent queue, messages having associated sequence identifiers which are not greater than the sequence identifier of the commit message.

3. A method according to claim 2, wherein a plurality of commit messages are received at the source device and where said discarding step comprises discarding from the source persistent queue messages having associated sequence identifiers which are not greater than a largest sequence identifier of the sequence identifiers of the plurality of received commit messages.

4. A method according to claim 1, further comprising the steps of:

determining if a new connection between the source device and the destination device has been established;

responsive to determining if a new connection has been established, transmitting a resync message from the destination device to the source device, wherein the resync message identifies a largest sequence identifier of consecutive sequence identifiers associated with received messages of a sequence of messages which have been persistently stored in the destination persistent queue.

5. A method according claim 4, further comprising the steps of:

determining a message stored in the source persistent queue having an associated sequence identifier which is a next greater sequence identifier than the sequence identifier received from the destination device responsive to determining if a new connection has been established; and beginning transmission of messages stored in the source persistent queue to the destination device from the determined message stored in the source persistent queue having an associated sequence identifier which is a next greater sequence identifier than the sequence identifier received from the destination device.

6. A method according to claim 5, further comprising the step of discarding messages from the source persistent queue having an associated sequence identifier which is not greater than the highest sequence identifier received from the destination device.

7. A method according to claim 1, further comprising the steps of:

receiving a request from a user application of the destination device for a message received from the source device;

determining if a received message and an associated sequence identifier stored in the destination persistent queue at the destination device has an associated sequence identifier which is not greater than a highest sequence identifier associated with a persistently stored message; and providing, to the requesting user application, a message stored in the destination persistent queue with the smallest sequence identifier if a received message and an associated sequence identifier is stored in the destination persistent queue at the destination device has an associated sequence identifier which is not greater than a highest sequence identifier associated with a persistently stored message.

8. The method of claim 7, wherein the highest sequence number associated with a persistently stored message comprises a highest sequence number of persistently stored messages having continuous sequence numbers in the sequence number order irrespective of whether a persistently stored message has a higher sequence number which is discontinuous from the persistently stored messages having continuous sequence numbers.

9. A method of communicating between a source device and a destination device over an external communication link, the method comprising:

transmitting a message stored in a source persistent queue at the source device over the external communication link to the destination device, wherein the transmitted message has transmitted with it an associated sequence identifier which identifies the message stored in the source persistent queue;

receiving the transmitted message and the associated sequence identifier at the destination device and storing the received message and the associated sequence identifier in a destination persistent queue at the destination device;

transmitting to the source device from the destination device a commit message, wherein the commit message identifies a largest sequence identifier of consecutive sequence identifiers associated with received messages of a sequence of messages which have been persistently stored in the destination persistent queue;

making the persistently stored message in the destination persistent queue available to users of the destination device independent of whether a commit message identifying the message has been transmitted to the source device;

transmitting a resync message from the source device to the destination device; and responsive to receiving a resync message, transmitting to the source device from the destination device a commit message, wherein the commit message identifiers a largest sequence identifier associated with a last received message of a sequence of messages which has been persistently stored in the destination persistent queue.

10. The method of claim 9, further comprising the step of determining if the source persistent queue has reached a fill threshold; and wherein the step of transmitting a resync message comprises transmitting a resync message from the source device to the destination device responsive to the determination of whether the source persistent queue has reached a fill threshold.

11. The method of claim 9, wherein the step of transmitting a resync message is performed responsive to determining that a connection has been reestablished between the source device and the destination device.

12. A system for communicating between a source device and a destination device over an external communication link utilizing a queue-to-queue transfer system, comprising:

means for transmitting messages stored in a source persistent queue at the source device over the external communication link to the destination device, wherein the transmitted messages have transmitted with them an associated sequence identifier which identifies the message stored in the source persistent queue and wherein the source persistent queue maintains the messages to be transmitted and associated sequence identifiers between execution of instances of the queue-to-queue transfer system by the source device;

means for receiving the transmitted messages and the associated sequence identifiers at the destination device in an order other than an order of the sequence identifiers of the messages and storing the received message and the associated sequence identifier in a destination persistent queue at the destination device and wherein the destination persistent queue maintains the received message and associated sequence identifier between execution of instances of the queue-to-queue transfer system by the destination device;

means for transmitting to the source device from the destination device a commit message, wherein the commit message identifies a largest sequence identifier of consecutive sequence identifiers associated with received messages of a sequence of messages which have been persistently stored in the destination persistent queue; and means for making the persistently stored message in the destination persistent queue available to users of the destination device independent of whether a commit message identifying the message has been transmitted to the source device.

13. A system according to claim 12, further comprising:

means for receiving at the source device a commit message from the destination device, wherein the commit message specifies a sequence identifier of a message; and means for discarding from the source persistent queue, messages having associated sequence identifiers which are not greater than the sequence identifier of the commit message.

14. A system according to claim 13, wherein a plurality of commit messages are received at the source device and where said means for discarding comprises means for discarding from the source persistent queue messages having associated sequence identifiers which are not greater than a largest sequence identifier of the sequence identifiers of the plurality of received commit messages.

15. A system according to claim 12, further comprising:

means for determining if a new connection between the source device and the destination device has been established;

means, responsive to the means for determining if a new connection has been established, for transmitting a resync message from the destination device to the source device, wherein the resync message identifies a largest sequence identifier of consecutive sequence identifiers associated with received messages of a sequence of messages which have been persistently stored in the destination persistent queue.

16. A system according claim 15, further comprising:

means for determining a message stored in the source persistent queue having an associated sequence identifier which is a next greater sequence identifier than the sequence identifier received from the destination device responsive to determining if a new connection has been established; and means for beginning transmission of messages stored in the source persistent queue to the destination device from the determined message stored in the source persistent queue having an associated sequence identifier which is a next greater sequence identifier than the sequence identifier received from the destination device.

17. A system according to claim 16, further comprising means for discarding messages from the source persistent queue having an associated sequence identifier which is not greater than the highest sequence identifier received from the destination device.

18. A system according to claim 12, further comprising:

means for receiving a request from a user application of the destination device for a message received from the source device;

means for determining if a received message and an associated sequence identifier stored in the destination persistent queue at the destination device has an associated sequence identifier which is not greater than a highest sequence identifier associated with a persistently stored message; and means for providing, to the requesting user application, a message stored in the destination persistent queue with the smallest sequence identifier if a received message and an associated sequence identifier in stored in the destination persistent queue at the destination device has an associated sequence identifier which is not greater than a highest sequence identifier associated with a persistently stored message.

19. The system of claim 18, wherein the highest sequence number associated with a persistently stored message comprises a highest sequence number of persistently stored messages having continuous sequence numbers in the sequence number order irrespective of whether a persistently stored message has a higher sequence number which is discontinuous from the persistently stored messages having continuous sequence numbers.

20. A system for communicating between a source device and a destination device over an external communication link, comprising:

means for transmitting a message stored in a source persistent queue at the source device over the external communication link to the destination device, wherein the transmitted message has transmitted with it an associated sequence identifier which identifies the message stored in the source persistent queue;

means for receiving the transmitted message and the associated sequence identifier at the destination device and storing the received message and the associated sequence identifier in a destination persistent queue at the destination device;

means for transmitting to the source device from the destination device a commit message, wherein the commit message identifies a largest sequence identifier of consecutive sequence identifiers associated with received messages of a sequence of messages which have been persistently stored in the destination persistent queue;

means for making the persistently stored message in the destination persistent queue available to users of the destination device independent of whether a commit message identifying the message has been transmitted to the source device;

means for transmitting a resync message from the source device to the destination device; and means, responsive to receiving a resync message, for transmitting from the destination device to the source device the highest sequence identifier of a message persistently stored in the destination persistent queue.

21. The system of claim 20, further comprising means for determining if the source persistent queue has reached a fill threshold; and wherein the means for transmitting a resync message comprises means for transmitting a resync message from the source device to the destination device responsive to the means for determining if the source persistent queue has reached a fill threshold.

22. The system of claim 20, further comprising means for determining if a connection has been reestablished between the source device and the destination device; and wherein the means for transmitting a resync message is responsive to the means for determining if a connection has been reestablished between the source device and the destination device.

23. A computer program product for communicating between a source device and a destination device over an external communication link utilizing a queue-to-queue transfer,system, comprising:

a computer-readable storage medium having computer-readable program code means embodied in said medium, said computer-readable program code means comprising:

computer-readable program code means for transmitting messages stored in a source persistent queue at the source device over the external communication link to the destination device, wherein the transmitted messages have transmitted with them an associated sequence identifier which identifies the message stored in the source persistent queue and wherein the source persistent queue maintains the messages to be transmitted and associated sequence identifiers between execution of instances of the queue-to-queue transfer system by the source device;

computer-readable program code means for receiving the transmitted messages and the associated sequence identifiers at the destination device in an order other than an order of the sequence identifiers of the messages and storing the received message and the associated sequence identifier in a destination persistent queue at the destination device and wherein the destination persistent queue maintains the received message and associated sequence identifier between execution of instances of the queue-to-queue transfer system by the destination device;

computer-readable program code means for transmitting to the source device from the destination device a commit message, wherein the commit message identifies a largest sequence identifier of consecutive sequence identifiers associated with received messages of a sequence of messages which have been persistently stored in the destination persistent queue; and computer-readable program code means for making the persistently stored message in the destination persistent queue available to users of the destination device independent of whether a commit message identifying the message has been transmitted to the source device.

24. A computer program product according to claim 23, further comprising:

computer-readable program code means for receiving at the source device a commit message from the destination device, wherein the commit message specifies a sequence identifier of a message; and computer-readable program code means discarding from the source persistent queue, messages having associated sequence identifiers which are not greater than the sequence identifier of the commit message.

25. A computer program product according to claim 24, wherein a plurality of commit messages are received at the source device and where said computer-readable program code means for discarding comprises computer-readable program code means for discarding from the source persistent queue messages having associated sequence identifiers which are not greater than a largest sequence identifier of the sequence identifiers of the plurality of received commit messages.

26. A computer program product according to claim 23, further comprising:

computer-readable program code means for determining if a new connection between the source device and the destination device has been established;

computer-readable program code means, responsive to the computer-readable program code means for determining if a new connection has been established, for transmitting a resync message from the destination device to the source device, wherein the resync message identifies a largest sequence identifier of consecutive sequence identifiers associated with received messages of a sequence of messages which have been persistently stored in the destination persistent queue.

27. A computer program product according claim 26, further comprising:

computer-readable program code means for determining a message stored in the source persistent queue having an associated sequence identifier which is a next greater sequence identifier than the sequence identifier received from the destination device responsive to determining if a new connection has been established; and computer-readable program code means for beginning transmission of messages stored in the source persistent queue to the destination device from the determined message stored in the source persistent queue having an associated sequence identifier which is a next greater sequence identifier than the sequence identifier received from the destination device.

28. A computer program product according to claim 27, further comprising computer-readable program code means for discarding messages from the source persistent queue having an associated sequence identifier which is not greater than the highest sequence identifier received from the destination device.

29. A computer program product according to claim 23, further comprising:

computer-readable program code means for receiving a request from a user application of the destination device for a message received from the source device;

computer-readable program code means for determining if a received message and an associated sequence identifier stored in the destination persistent queue at the destination device has an associated sequence identifier which is not greater than a highest sequence identifier associated with a persistently stored message; and computer-readable program code means for providing, to the requesting user application, a message stored in the destination persistent queue with the smallest sequence identifier if a received message and an associated sequence identifier in stored in the destination persistent queue at the destination device has an associated sequence identifier which is not greater than a highest sequence identifier associated with a persistently stored message.

30. The computer program product of claim 29, wherein the highest sequence number associated with a persistently stored message comprises a highest sequence number of persistently stored messages having continuous sequence numbers in the sequence number order irrespective of whether a persistently stored message has a higher sequence number which is discontinuous from the persistently stored messages having continuous sequence numbers.

31. A computer program product for communicating between a source device and a destination device over an external communication link, comprising:

a computer-readable storage medium having computer-readable program code means embodied in said medium, said computer-readable program code means comprising:

computer-readable program code means for transmitting a message stored in a source persistent queue at the source device over the external communication link to the destination device, wherein the transmitted message has transmitted with it an associated sequence identifier which identifies the message stored in the source persistent queue;

computer-readable program code means for receiving the transmitted message and the associated sequence identifier at the destination device and storing the received message and the associated sequence identifier in a destination persistent queue at the destination device;

computer-readable program code means for transmitting to the source device from the destination device a commit message, wherein the commit message identifies a largest sequence identifier of consecutive sequence identifiers associated with received messages of a sequence of messages which have been persistently stored in the destination persistent queue;

computer-readable program code means for making the persistently stored message in the destination persistent queue available to users of the destination device independent of whether a commit message identifying the message has been transmitted to the source device;

computer-readable program code means for transmitting a resync message from the source device to the destination device; and computer-readable program code means, responsive to receiving a resync message, for transmitting from the destination device to the source device the highest sequence identifier of a message persistently stored in the destination persistent queue.

32. The computer program product of claim 31, further comprising computer readable program code means for determining if the source persistent queue has reached a fill threshold; and wherein the computer readable program code means for transmitting a resync message comprises computer readable program code means for transmitting a resync message from the source device to the destination device responsive to the computer readable program code means for determining if the source persistent queue has reached a fill threshold.

33. The computer program product of claim 31, further comprising computer readable program code means for determining if a connection has been reestablished between the source device and the destination device; and wherein the computer readable program code means for transmitting a resync message is responsive to the computer readable program code means for determining if a connection has been reestablished between the source device and the destination device.

* * * * *